United States Patent
Kao (10) Patent No.: US 6,453,080 B1
(45) Date of Patent: Sep. 17, 2002

(54) METHOD FOR REAL-TIME AUTO-CROPPING A SCANNED IMAGE

(75) Inventor: Jenny Kao, Taipei (TW)

(73) Assignee: Mustek Systems Inc., Hsinchu (TW)

( * ) Notice: Subject to any disclaimer, the term of this patent is extended or adjusted under 35 U.S.C. 154(b) by 0 days.

(21) Appl. No.: 09/418,767

(22) Filed: Oct. 15, 1999

(51) Int. Cl.$^7$ .................................................. G06K 7/00
(52) U.S. Cl. ........................ 382/312; 382/318; 382/319; 358/487; 358/505
(58) Field of Search ................................ 382/312, 318, 382/319, 313, 173, 289; 358/487, 505

(56) References Cited

U.S. PATENT DOCUMENTS

| | | | | |
|---|---|---|---|---|
| 4,482,924 A | * | 11/1984 | Brownstein | 358/302 |
| 5,781,665 A | * | 7/1998 | Cullen et al. | 382/254 |
| 5,880,858 A | * | 3/1999 | Jin | 358/487 |
| 6,201,619 B1 | * | 3/2001 | Neale et al. | 358/505 |
| 6,310,984 B2 | * | 10/2001 | Sansom-Wai et al. | 382/289 |
| 6,360,026 B1 | * | 3/2002 | Kulkarni et al. | 382/289 |

OTHER PUBLICATIONS

Huang et al., "Detection of Human Faces Using Decision Trees", IEEE Proceedings of the Second International Conference on Automatic Face and Gesture Recognition, 1996, pp. 248–252.*

* cited by examiner

Primary Examiner—David Moore
Assistant Examiner—Anh Hong Do
(74) Attorney, Agent, or Firm—Christensen O'Connor Johnson Kindness PLLC (57) ABSTRACT

The method of the invention involves in finding the width and length of a scanned image in real time and then write the length and width into the header of a bitmap file as soon as the bottom line of the scanned image is found. The width of the scanned image can be computed from the width of the first occurrence of the meaningful image region. The width will be transferred to the scanner to reset the scan width for reading subsequent image data. The length of the scanned image cannot be determined until a bottom line is found. Each meaningful image region can be simultaneously written into the bitmap file while examining the bottom line of the scanned image. To find the bottom line, for each meaningful image region, sample a plurality of line areas to determine if the meaningful image region contains the bottom line. For each meaningful image region examined, sum up the total number of image lines until the bottom line is reached. Eventually, when the bottom line is found, the width and length of the scanned image will be written into the header of the bitmap file.

15 Claims, 7 Drawing Sheets

| TRUE | TRUE | TRUE | TRUE |
| TRUE | TRUE | TRUE | TRUE |
| TRUE | TRUE | TRUE | TRUE |

Fig.6A

| FALSE | FALSE | FALSE | FALSE |
| FALSE | FALSE | FALSE | FALSE |
| FALSE | FALSE | FALSE | FALSE |

Fig.6B

| 61 | 62 | 63 | 64 |
|---|---|---|---|
| TRUE | TRUE | FALSE | FALSE |
| TRUE | TRUE | FALSE | FALSE |
| TRUE | TRUE | FALSE | FALSE |

METHOD FOR REAL-TIME AUTO-CROPPING A SCANNED IMAGE

BACKGROUND OF THE INVENTION

A. Field of the Invention

The present invention relates to a method for image processing, especially to a method for real-time auto-cropping a scanned image without performing the process of prescan.

B. Description of the Prior Art

The method of auto-cropping an image is a technology for selectively reading a scanned image from a background image which is usually black. According to current technology, the technology of auto-cropping an image must be performed after the process of prescan because the crop range of the scanned image cannot be determined beforehand. The function of image auto-crop can be provided by either a non-user interface scan (Non-UI Scan) or a user interface scan (UI Scan). The "UI Scan" here refers to a "TWAIN user interface" in the TWAIN module. And the "non-UI Scan" refers to a "User Interface not in the TWAIN module". In either a non-UI scan or a UI scan, the prescan process must be performed first. Then, each pixel of the pre-scanned image is evaluated according to its R (Red) G (Green) B (Blue) values, thereby to determine the actual crop range for the scanned image. After determining the crop range, the scanner will be reset to read the image defined by the crop range and then discard the rest image. Or, the user may manually select the area of interest from the scanned image.

The disadvantages of the conventional technology is that the time and resources required for image auto-cropping is always the same regardless of the size of the desired image. It is because a prescan process is always required. If the area of interest is very small, most prescanned image transmitted from the scanner is useless while still consumes the same sources for processing. For instance, the time required for scanning an image of A3 size is the same as scanning a 3×5 photo because the scanner must perform a prescan of an A3 image in color mode first. For non-user interface scan, the process would be more complicated. First, the crop range of the 3×5 photo can only be obtained by computing its coordinates following a computation algorithm. Then, based on the crop range, the scanner will be reset to locate on the position of the 3×5 photo and then enabled to perform a second image reading to get the image of the area of interest.

SUMMARY OF THE INVENTION

Accordingly, it is an object of the present invention to provide a method for real-time image auto-cropping, which can determine the crop range in read-time while reading the desired image data, thereby to efficiently crop the desired image without the process of prescan.

It is another object of the present invention to provide a method for real-time image auto-cropping, which can directly read the image data of the area of interest without having to transfer useless image data from the scanner, thereby to reduce the scanning time and process time.

In accordance with the invention, the method of the invention involves in finding the width and length of a scanned image in real time and then write the length and width into the header of a bitmap file as soon as the bottom line is found for a non-UI access. On the other hand, the image buffer data may be returned to the upper level image application program for a UI access. At the same time, the image data within the crop range can be automatically written into the bitmap file while searching for the bottom line of the scanned image. The width of the meaningful image regions can be determined by computing the distance between the position of a leftmost start pixel and the position of a rightmost end pixel of a meaningful image region first appeared in a partial image block. The width computed is transferred back to the scanner so as to reset the width for reading the subsequent image data. The length of the scanned image cannot be determined until a bottom line is found.

To find the bottom line, for each meaningful image region, sample a plurality of line areas to determine if the meaningful image region contains the bottom line. For each meaningful image region examined, sum up the total number of image lines until the bottom line is reached. Eventually, for non-UI access, when the bottom line is found, the size of the scanned image is also determined. For TWAIN UI access, the parameter indicating the end of image data is transferred to the upper level image application program. The whole process is performed in real-time and without the process of prescan. The present invention can efficiently save the scan time because it only reads the desired image data after finding the width of the scanned image and can stop scanning right after a bottom line of the scanned image is found. Consequently, if the scanned image is a 3×5 photo, the scanner will stop right after finishing reading the image of the 3×5 photo.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

A preferred embodiment of the invention is described below. This embodiment is merely exemplary. Those skilled in the art will appreciate that changes can be made to the disclosed embodiment without departing from the spirit and scope of the invention.

Figure 1:
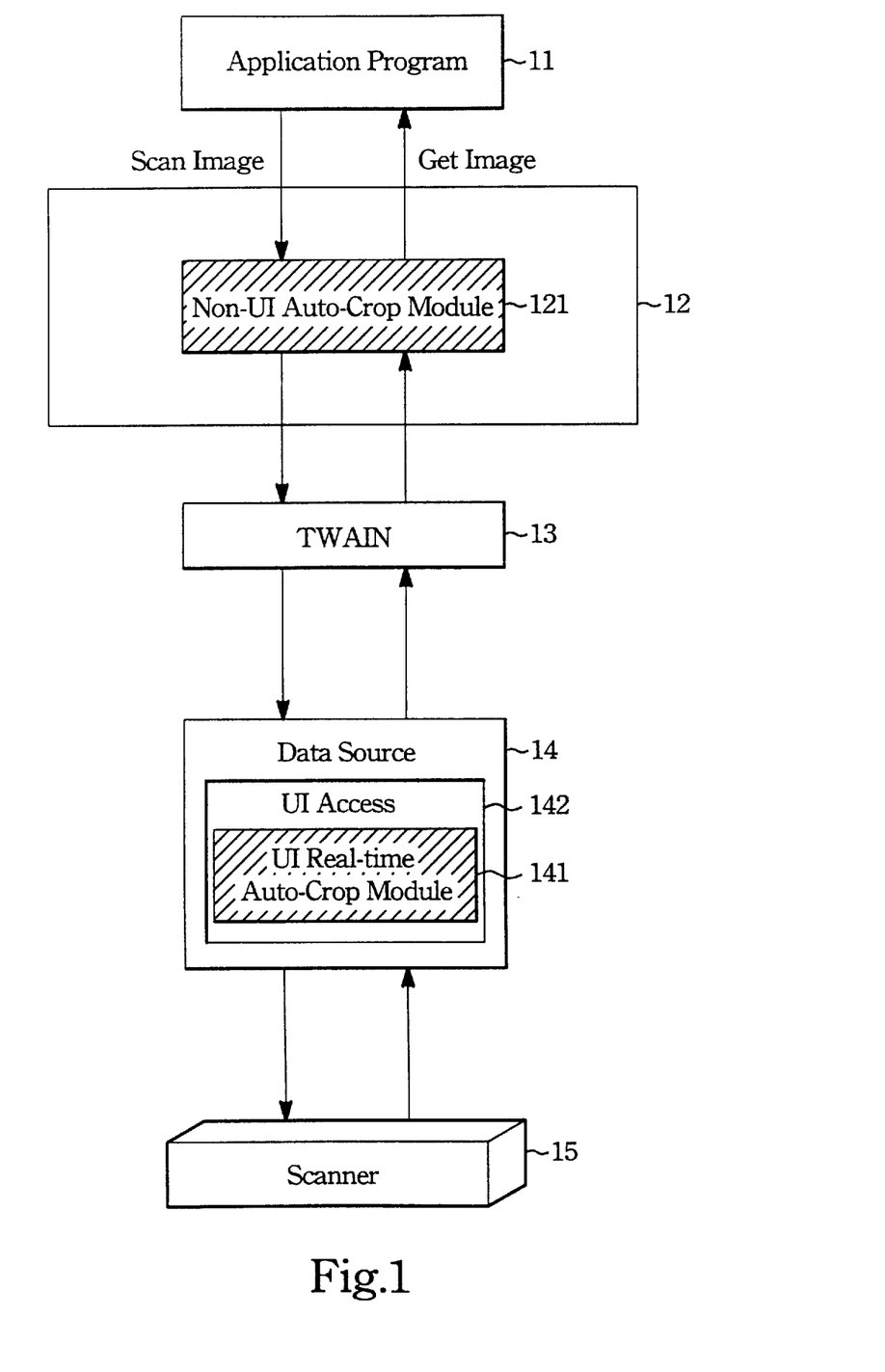
FIG. 1 is a flowchart showing the data flow of TWAIN when interfacing the application program and the scanner.

The structure of the present invention is illustrated in FIG. 1. The functions of auto-cropping a scanned image can be distinguished as non-user interface access 12 (Non-UI access) and user interface access (UI access) 142. The non-UI access 12 can be called by an upper level image application program 11 which can read the image data transferred from the scanner 15 via the TWAIN (Technology Without an Important/Interesting Name) 13 interface. Since TWAIN interface standard does not provide a constant parameter for automatically setting a crop range, therefore the crop range cannot be set via TWAIN 13. For this reason, the present invention provides a Non-UI Auto-Crop module 121 in the non-UI access 12. So, the user can still perform image auto-cropping for images of uniform sizes under an upper level image application program 11. Consequently, when an upper level image application program 11 is activated, the TWAIN 13 driver can be used as an interface between the upper level image application program 11 and the scanner 15 if the upper level image application program 11 directly reads the image of the scanned objects. The scanned image transferred from the scanner 15 will be stored in the data source 14 for the TWAIN 13 driver to access.

On the other hand, for UI access 142, since the commands can be set without TWAIN, so the crop range can be set directly. The present invention also provides a UI real-time Auto-Crop module 141 in the TWAIN UI access 142 of the data source 14 to directly set the real-time crop range in the data source 14. Both the UI real-time Auto-Crop module 141 and the Non-UI real-time Auto-Crop module 121 can perform real-time image auto-crop without a prescan process. Although the initial settings of the UI real-time Auto-Crop module 141 and the Non-UI real-time Auto-Crop module 121 are different, their procedures are basically the same with respect to the algorithms for determining the crop range of the scanned image.

Since the present invention intends to determine the size of the scanned image in real-time rather than from the prescanned image, so the primary objects of the inventive method is to find the length and width of the scanned image at the time when the image data are transferred from the scanner 15. The image data transferred from the scanner 15 is temporary stored in a memory device for further process. The pixels in the memory device are arranged in a sequential order that each pixel are represented by Blue, Green, and Red color, each color being of 1 byte.

To prevent from reading too many meaningless image data at one time, the invention read only a partial image block from the scanner at one time. The partial image block is stored in the memory device. The partial image block is the 1/N of the entire scanned image. The 1/N of the entire scanned image means that the width of the partial image block is the same as that of the entire scanned image with only the 1/N length of the entire scanned image. N is a predetermined value, such as 5. After the size of the partial image block is set, the scanner will transfer 1/N partial image block each time to the memory device until the 1/N partial image block is determined to contain meaningful image data.

To find the width of the scanned image, a memory space is declared for recording the attribute of each pixel stored in the memory device. Each location of the memory space is correspondent to each pixel of the memory device for recording the attribute of a pixel. The attribute of the pixel indicates if the pixel is a meaningful pixel or a meaningless pixel. If the R,G,B of the pixel is smaller than predetermined color values, then the pixel is determined to be meaningless. If none of the pixels in the memory device is meaningful, the whole image data in the memory device will be discarded. The scanner 15 will transfer next 1/N partial image block to the memory space. The process repeats until the memory space is determined to contain a meaningful image region.

Figure 2:
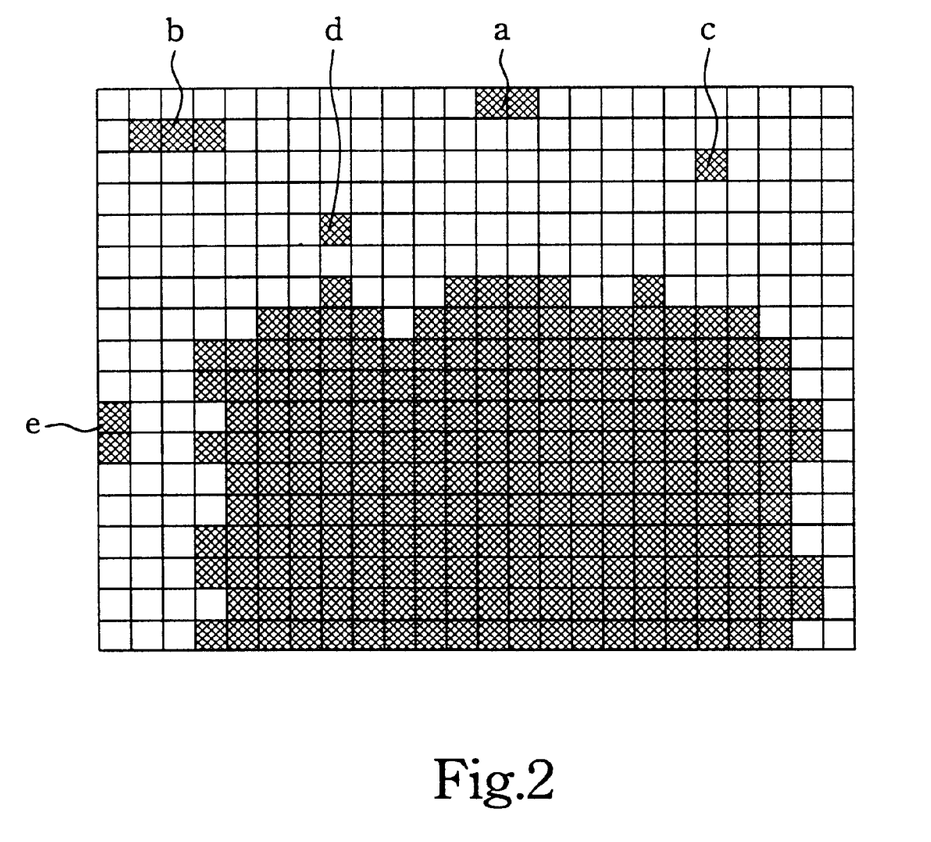
FIG. 2 is a schematic diagram showing the scanned image containing noise pixels.
Figure 3:
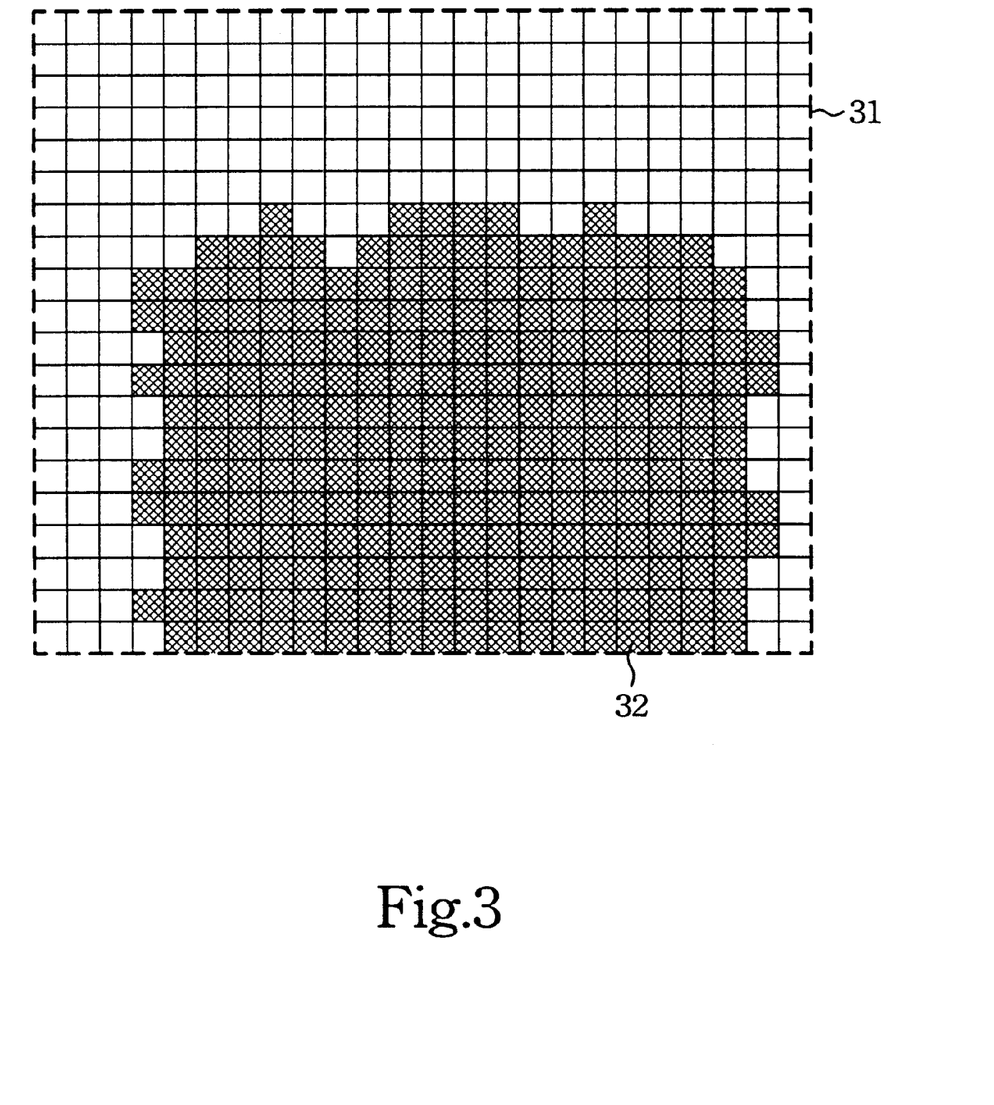
FIG. 3 is a schematic diagram showing the computation of the width of the desired meaningful image region.

The meaningful image region refers to the meaningful image pixels in the area of interest. To precisely determine the scope of the meaningful image region, the present invention removes noise pixels first. If the R, G, B values of the pixel is larger than a predetermined color levels, and the number of its neighboring contiguous pixels is less than K (such as 4), then the pixel is determined to be a noise pixel, and must be removed. Refer to FIG. 2, the a, b, c, d, and e pixels indicating their R, G, B values are larger than 60 and not arranged contiguously. In such case, these pixels are considered as noise pixels. After the noise pixels are removed, the meaningful image regions 32 of the partial image block 31 in the memory space will look like as illustrated in FIG. 3.

Figure 4A:
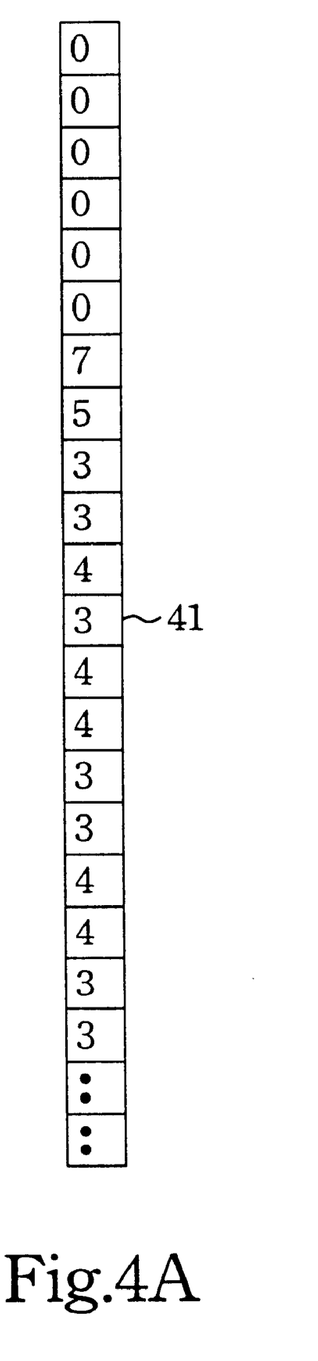
FIGS. 4A–4B are schematic diagrams showing arrays for computing the positions of the leftmost start pixel and the rightmost end pixel.

Since the right and left sides of the meaningful image region 32 will not be well-aligned when they are represented by pixels, so the positions of the pixels at the leftmost column and the rightmost column are averaged. That is, each first pixel on each horizontal image lines and each last pixel on each horizontal image lines will be summed up respectively and then divided by the total number of horizontal lines of the meaningful image region 32. So, sequentially record each first meaningful pixel of each horizontal image line of the partial image block 31 in an array 41, as illustrated in FIG. 4A. For instance, the array 41 includes all the pixels of the partial image block including the meaningless pixels. The initial position of the first line is "0", and the last position of the first line is also "0" which indicating that there is no meaningful pixel at that position. Since the area close to the edge of the meaningful image region 32 will also not be well-aligned, so discard the first few lines to determine the front edge of the meaningful image region 32. For instance, discard the first two rows, that is, "7" and "5". Then, count the following 50 rows as the desired area of the meaningful image region 32. Also, take "3" and the initial position of the front edge of the meaningful image region 32. Then, for each initial position of each row, compute their average value which will be the initial aligned leftmost position of the meaningful image region 32.

Figure 4B:
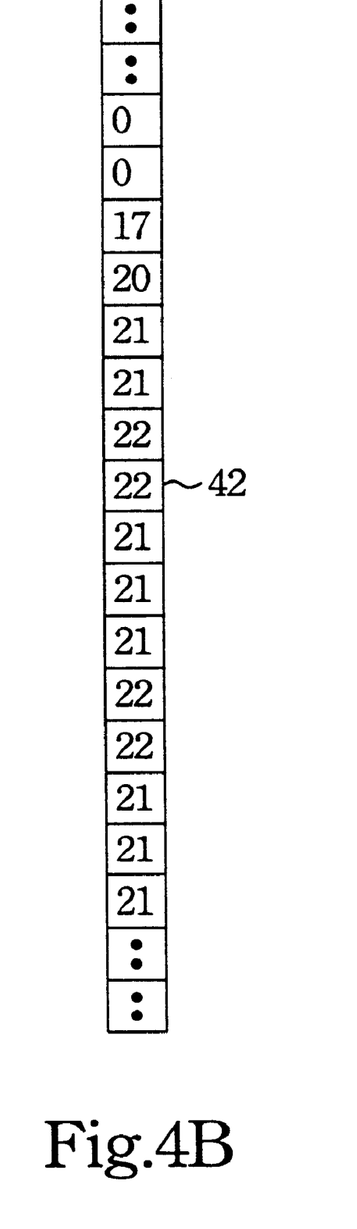

On the other hand, sequentially record each last meaningful pixel for each horizontal image line of the partial image block 31 in an array 42, as illustrated in FIG. 4B. Refer to FIG. 4B, discard the first two rows, that is, "17" and "20" and then compute the rightmost position of the meaningful image region 32 starting from "21". "21" represents the $21^{st}$ position of the last meaningful pixel at that row. Following the same rule, compute the average value of all the values in the array 42. The average value will be the final aligned rightmost position for the meaningful image region 32.

After aligned, the width of the meaningful image region 32 can be determined by computing the distance between the leftmost start pixel and the rightmost end pixel of the first occurrence of the meaningful image region 32. Then, the width will be transferred as a parameter to the scanner for resetting the scan width for the subsequent image data. The memory space will then be released for it will not be in use for the following procedures.

Figure 5:
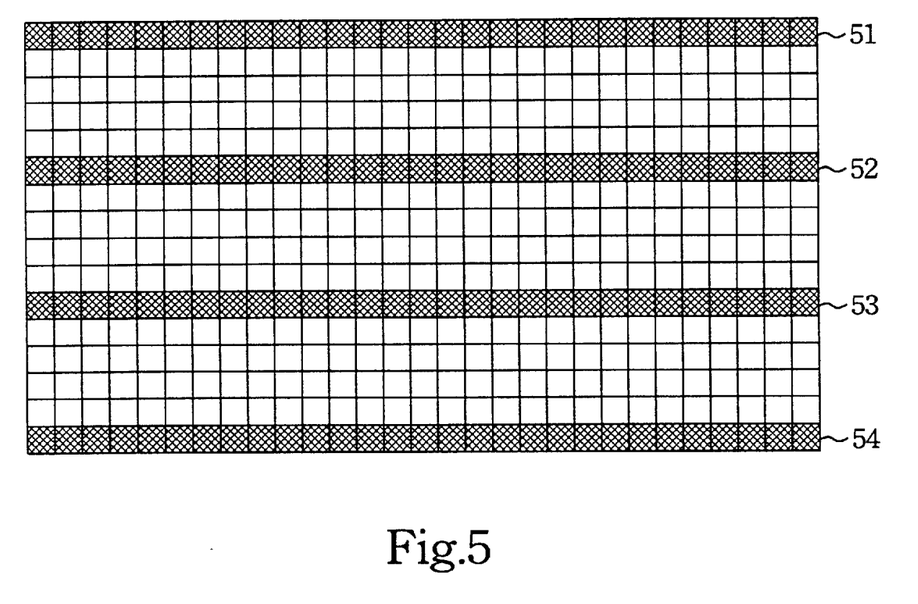
FIG. 5 is a schematic diagram showing the method for searching the bottom line of the scanned image.

The first occurrence of the meaningful image region 32 will be written into a bitmap file. At the same time, a parameter passing from the lower programming level will include the data indicating the number of image lines stored in the memory space. Then, the value of the parameter minus the starting position of the meaningful image region 32 can get the length of the meaningful image region 32 of the partial image block 31. Record and sum up the number of valid image lines. Since the scanning procedure is still continuing during this time, so the total length of the meaningful image region 32 cannot be obtained yet. Since the length of the scanned image cannot be determined until its bottom line is found, so a detecting procedure must be performed for each meaningful image region to detect where the scanned image ends. There may be several ways for such detection. The present invention provides a sampling method for selectively detecting a plurality of line areas to find the bottom line of the scanned image, as illustrated in FIG. 5.

First, dividing each image block into 4 line areas, the first line area 51 indicating the top edge of the memory device, and the last line area 54 indicating the bottom edge of the memory device. The two line areas 52, 53 in the middle part are equally apart. Each line area contains 3 image lines. Suppose n represents the total number of lines of the meaningful image region, then the distance m between each line area can be computed by:

$$(n-(4\times 3))\div 3=m.$$

Then, check the attribute of each pixel in each line area. For every 10 pixels, pick a pixel to check its attribute. The attribute of a line area can be determined according to the following rules:

(1) If the R, G, B values of a pixel are all smaller than 60 values, then the pixel is determined to be meaningless. And if the percentage of meaningless pixels of the line area exceeds 90%, then the line area is determined to be meaningless.

(2) If the percentage of meaningless pixels of the line area is lower than 90%, then a second check should be performed. Right shift the initial check position to a few pixels, and for every 10 pixels pick up a sample pixel to perform the detection as described in step (1). For instance, suppose three times are checked at the most, the first check starts at position 1, the second check at the $3^{rd}$ position, the third check at the $6^{th}$ position and so on. If the percentage of the meaningless pixels is over 90%, then determine this line area is meaningless.

(3) If in step (2) the percentage of the meaningless pixels is still lower than 90%, then the same check must be performed the third time. That is, right shift the pixel to a few pixels again and perform the test same as in the step (1) and (2).

After the attribute of each line area is determined, the position of the bottom line can be determined from the result, as illustrated in FIG. 6A~6E.

Figure 6A:
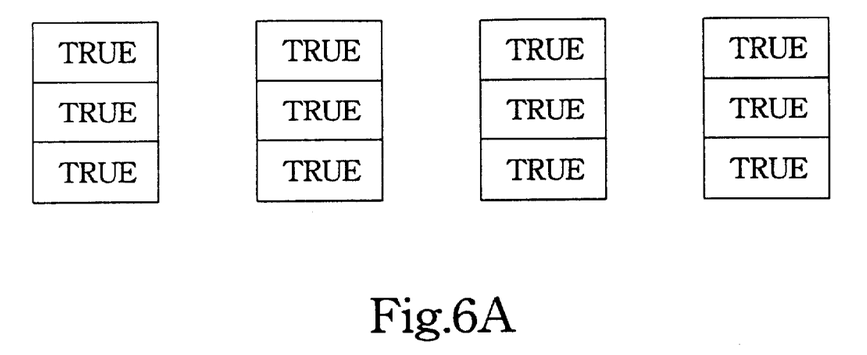
FIGS. 6A–6E are schematic diagrams showing the method for searching the meaningful line areas.

If the four line areas are all meaningful, as illustrated in FIG. 6A, then it indicates that the image data transferred from the memory device are all meaningful. If these line areas are sampled at the first time, and read via a TWAIN UI access 142, and directly transferred from the memory device of the scanner, then fill in the data required for a program parameter and pass the program parameter to the upper level image application program. The data required for a program parameter includes: the pointer of the meaningful image region in the memory device, and the number of image lines of the valid image data in the meaningful image region.

On the other hand, if the line areas are read via a TWAIN UI access 142 or a non-UI access 12, which requesting to return an image file, then the image data of the meaningful image region is written into the file. Then, sum up the total number of valid image lines returned by the low level programming parameter and continue to receive the image data transferred from the memory device of the scanner.

If these line areas are sampled at the last time, then it indicates that the area below the line area is meaningless and the end of the image has been found. If the line areas are read via a TWAIN UI access 142 which requesting to directly receive image data from the scanner, then fill in the data required for a program parameter and passing the program parameter to the upper image application program. The data required for a program parameter includes: the pointer of the meaningful image region in the memory means, the number of valid image lines of the meaningful image region, and file close data. Then, send a file terminating signal to the scanner to stop scanning.

If the line areas are sampled at the last time, and read via a non-UI access 12, then sum up the total number of current meaningful image lines, fill in the bitmap file header, and close the file. After that, send a control signal to the scanner to stop scanning. On the other hand, for TWAIN user interface access 142, send a file terminating signal to the upper level image application program to stop reading image data.

Figure 6B:
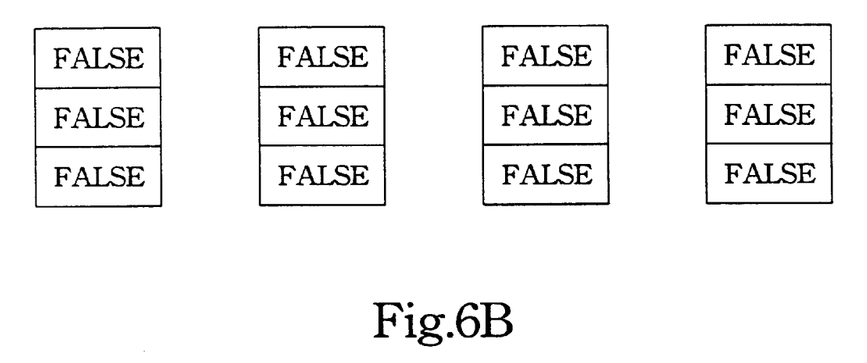

If the four line area are all meaningless as illustrated in FIG. 6B, then it indicates that the image data transferred from the memory device are all meaningless. So, ignore all these image data. If the line areas are sampled at the first time, and read via a TWAIN UI access 142, and directly transferred from the memory device of the scanner, then fill in the data required for a program parameter and passing the program parameter to an upper level image application program. The data required for a program parameter includes: the pointer of the meaningful image region in the memory device, and the number of image lines of the valid image data in the meaningful image region.

On the other hand, if the line areas are read via a TWAIN UI access 142 or a non-UI access 12, which requesting to return an image file, then write the image data of the meaningful image region into the file. And, sum up the total number of image lines returned by the parameter and continue to receive the image data transferred from the memory device of the scanner.

If these line areas have been sampled at the last time, then it indicates that the area below the line area is meaningless and the end of the image has been found. If the line areas are read via a TWAIN UI access 142 which requesting to directly receive image data from the scanner, then fill in the data required for a program parameter and passing the program parameter to the upper level image application program. The data required for a program parameter includes: the pointer of the meaningful image region in the memory means, the number of valid image lines of the meaningful image region, and file close data. Then, send a control signal to the scanner to stop scanning.

If the line areas are sampled at the last time, and read via a TWAIN user interface access or a non-UI access, then sum up the total number of current meaningful image lines, fill in the bitmap file header, and close the file. After that, send a control signal to the scanner to stop scanning.

Figure 6C:
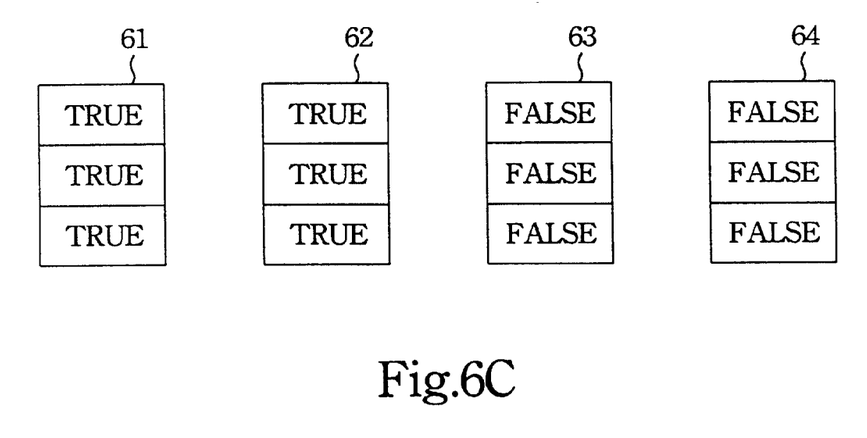

If the line areas 61, and 62 are meaningful while the line areas 63, 64 are meaningless as illustrated in FIG. 6C, then the bottom line of the meaningful image region will appear somewhere between the line areas 62 and 63. Under such circumstance, the sampling procedure must be performed again for the area between the line areas 62, and 63. The sampling process repeats until the bottom line of the scanned image has been found. After finding the bottom line of the scanned image, sum up the total number of image lines of the current meaningful image region.

Figure 6D:
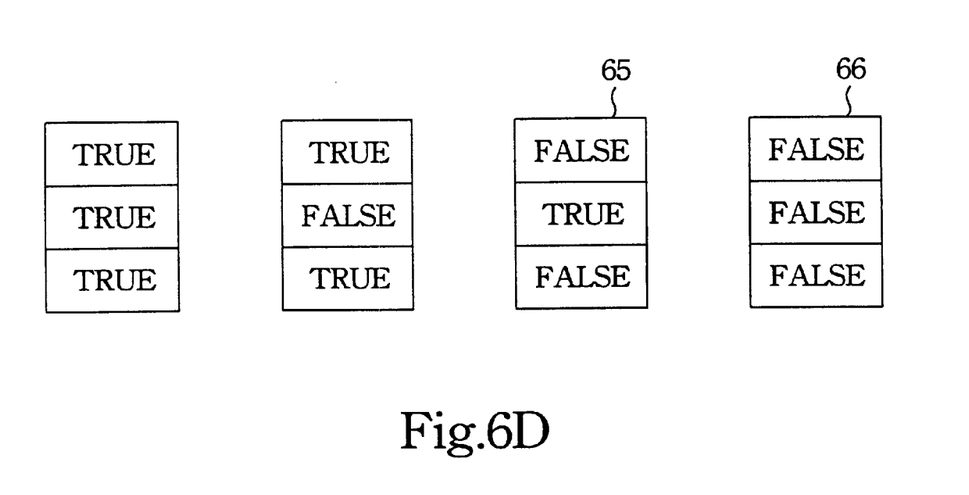

If the line areas are mixed with valid and invalid pixels as illustrated in FIG. 6D, then perform the sampling procedure again to find the meaningful image region somewhere between the meaningful line areas 65, and 66. That is because if the bottom line has been found, its pixels should appear in uniform black (all being noise pixels) rather than non-uniform colors. Accordingly, the bottom line of the scanned image should be located somewhere between line area 65 and 66. So, repeat the sampling procedure again for the image data between the line areas 65 and 66 until the bottom line is found. After finding the bottom line, sum up the image lines for the meaningful image region.

Figure 6E:
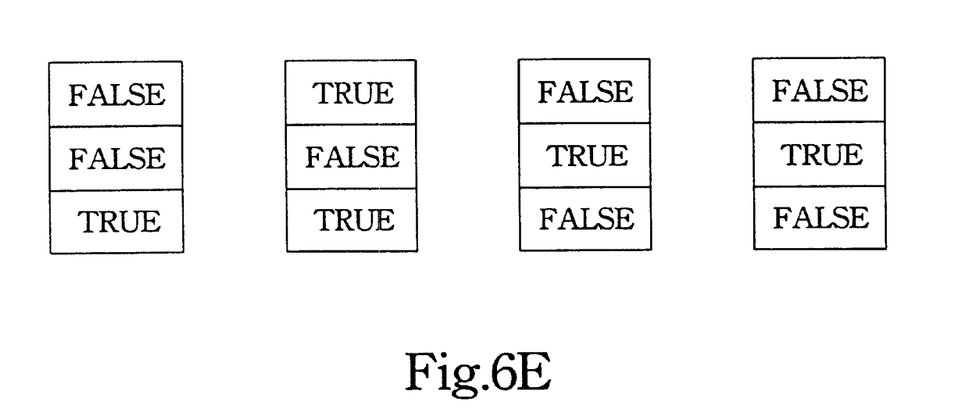

Another situation is illustrated in FIG. 6E which shows the line areas are mixed with meaningful pixels and meaningless pixels. In such case, take all the image data as meaningful. The process is the same as that for processing the situation when the four line areas are all meaningful.

Eventually, the present invention can finish reading the scanned image in real-time because each meaningful image region is written into the bitmap file at the time when the image data is reading from the memory device for a non-UI access. On the other hand, the image buffer data may be returned to the upper level image application program for a UI access. Moreover, the invention only reads meaningful image regions because the scanner will reset the scan width as soon as the width of the scanned image is computed. Consequently, the present invention can successfully save the process time and invalid data transmission.

Since the method of the present invention can save the prescan process, so the efficiency of the inventive method will be more remarkable especially when the scanner is scanning multiple documents of the same size. However, since the invention set a fixed width for reading image data, and does not consider the situation when the original is placed obliquely, so the inventive method is not applicable to such situation.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A method for real-time auto-cropping a scanned image, comprising the steps of:

(a) sequentially reading each partial image block from a scanner until a first meaningful image region is found, and then storing said each partial image block in a memory means of said scanner;

(b) recording an attribute of each pixel of said each partial image block in a memory space until said first meaningful image region is found, said attribute indicating if a pixel is meaningful or meaningless;

(c) computing a position of a leftmost start pixel and a position of a rightmost end pixel of said first meaningful image region after said first meaningful image region is found;

(d) sampling a plurality of line areas in each meaningful image region for determining a position of a bottom line for said scanned image;

(e) computing the width of said first meaningful image region based on said position of said leftmost start pixel and said position of said rightmost end pixel;

(f) resetting a scan width for said scanner to read subsequent image data in response to said width computed in said step (e);

(g) reading each subsequent meaningful image region until a bottom line is found, and directly writing the valid image data of said each subsequent partial image block into a bitmap file, and summing up the total number of image lines of the valid image data in said each subsequent meaningful image region, or transmitting said valid image data to an upper level image application program; and (h) setting the sum of the total number of image lines of the valid image data in said each meaningful image region as the length of said scanned image, and writing said width and said length into the header of said bitmap file, or sending a file terminating signal to an upper level image application program to stop reading said valid image data.

2. The method as claimed in claim 1, wherein said step (b) comprises the steps of:

determining a pixel is a meaningless pixel when the R,G,B values of said pixel are smaller than predetermined R,G,B values; and determining said pixel is a meaningful pixel when the R,G,B values of said pixel are larger than said predetermined R,G,B values.

3. The method as claimed in claim 1, wherein said step (c) comprises the steps of:

recording a sequence number of each meaningful pixel first found in each horizontal line of said first meaningful image region in a first array;

recording a sequence number of each meaningful pixel last found in each horizontal line of said first meaningful image region in a second array;

computing the position of said leftmost start pixel by averaging all the sequence numbers in said first array; and computing the position of said rightmost end pixel by averaging all the sequence numbers in said second array.

4. The method as claimed in claim 1, wherein said step (d) comprises the steps of:

selecting a plurality of line areas for each meaningful image region, each of said line areas comprising a plurality of image lines;

selectively reading pixels in each of said line areas for every predetermined number of pixels;

determining a line area as meaningful when the number of meaningful pixels in said line area exceeding a predetermined percentage; and determining a line area as meaningless when the number of meaningful pixels in said line area being below said predetermined percentage.

5. The method as claimed in claim 1, wherein said width and said length of said scanned image is defined in terms of bitmap file format.

6. The method as claimed in claim 4, further comprises the step of:

when said line areas are sampled at the first time and read via a TWAIN user interface access which requesting to directly receive said image data from said memory means of said scanner, filling in the data required for a program parameter and passing said program parameter to an upper level image application program, said data required for a program parameter comprising the pointer of said meaningful image region in said memory means, and the number of image lines of the valid image data in said meaningful image region;

when said line areas are sampled at the first time, and read via a TWAIN user interface access which requesting to return an image file, writing said meaningful image region into said image file; and when said line areas are sampled at the first time, and read via a non-user interface access, writing said meaningful image region into said image file, summing up the total number of image lines returned, and receiving image data returned from said scanner.

7. The method as claimed in claim 4, further comprises the steps of:

when said line areas are sampled at the last time, and read via a TWAIN user interface access which requesting to directly receive image data from said memory means of said scanner, filling in the data required for a program parameter and passing said program parameter to an upper level image application program, said data required for a program parameter comprising the pointer of said meaningful image region in said memory means, the number of valid image lines of said meaningful image region, and file close data;

when said line areas are sampled at the last time, and read via a TWAIN user interface access which requesting to return an image file, writing said meaningful image region into said image file, summing up the total number of current meaningful image lines, filing in the bitmap file header, and closing said bitmap file; and when said line areas are sampled at the last time, and read via a nonuser interface access, summing up the total number of current meaningful image lines, filing in the bitmap file header, and closing said bitmap file; and sending a control signal to said scanner to stop scanning.

8. The method as claimed in claim 1, further comprising the steps of:

(i) closing said bitmap file and passing the file name of said bitmap file as a program parameter to an upper level image application program, or returning said image data and a file terminating signal to said upper level image application program; and (j) sending a control signal to said scanner to stop scanning when said bottom line is found.

9. A method for real-time auto-cropping a scanned image, comprising the steps of:

(a) looking for a first meaningful image region in a partial image block, and writing the image data of said first meaningful image region into a bitmap file, and summing up the total number of image lines of said first meaningful image region;

(b) computing the width of said first meaningful image region;

(c) resetting a scan width for a scanner to read subsequent image data;

(d) sampling a plurality of line areas in each partial image block for determining a location of a bottom line for said scanned image;

(e) reading each subsequent meaningful image region until a bottom line is found, and directly writing the image data of each of said subsequent meaningful image region into said bitmap file, and summing up the total number of image lines for each of said subsequent meaningful image region;

(f) setting said sum of the total number of image lines as the length of said scanned image, and writing said width and said length into the header of said bitmap file, or transmitting said valid image data to an upper level image application program; and (g) closing said bitmap file, and passing the file name of said bitmap file as a parameter to an upper level image application program or a data source, or sending a file terminating signal to an upper level image application program to stop reading said valid image data; and (h) sending a control signal to said scanner to stop scanning.

10. The method as claimed in claim 9, wherein each pixel of said meaningful image regions is determined to be a meaningful pixel when the R,G,B values of said pixel are larger than said predetermined R,G,B values.

11. The method as claimed in claim 9, wherein said step (b) comprises the steps of:

recording a sequence number of each meaningful pixel first found in each horizontal line of said first meaningful image region in a first array;

recording a sequence number of each meaningful pixel last found in each horizontal line of said first meaningful image region in a second array;

computing said position of said leftmost start pixel by averaging all the sequence numbers in said first array; and computing said position of said rightmost end pixel by averaging all the sequence numbers in said second array.

12. The method as claimed in claim 9, wherein said step (d) comprises the steps of:

selecting a plurality of line areas for each meaningful image region, each of said line areas comprising a plurality of image lines;

selectively reading pixels in each of said line areas for every predetermined number of pixels;

determining a line area as meaningful when the number of meaningful pixels in said line area exceeding a predetermined percentage; and determining a line area as meaningless when the number of meaningful pixels in said line area being below said predetermined percentage.

13. The method as claimed in claim 9, wherein said width and said length of said scanned image is defined in terms of bitmap file format.

14. The method as claimed in claim 12, further comprises the steps of:

when said line areas are sampled at the first time and read via a TWAIN user interface access which requesting to directly receive said image data from said memory means of said scanner, filling in the data required for a program parameter and passing said program parameter to an upper level image application program, said data required for a program parameter comprising the pointer of said meaningful image region in said memory means, and the number of image lines of the valid image data in said meaningful image region;

when said line areas are sampled at the first time, and read via a TWAIN user interface access which requesting to return an image file, writing said meaningful image region into said image file; and when said line areas are sampled at the first time, and read via a non-user interface access, writing said meaningful image region into said image file, summing up the total number of image lines returned, and receiving image data returned from said scanner.

15. The method as claimed in claim 12, further comprises the steps of:

when said line areas are sampled at the last time, and read via a TWAIN user interface access which requesting to directly receive image data from said memory means of said scanner, filling in the data required for a program parameter and passing said program parameter to an upper level image application program, said data required for a program parameter comprising the pointer of said meaningful image region in said memory means, the number of valid image lines of said meaningful image region, and file close data;

when said line areas are sampled at the last time, and read via a TWAIN user interface access which requesting to return an image file, writing said meaningful image region into said image file, summing up the total number of current meaningful image lines, filing in the bitmap file header, and closing said bitmap file; and when said line areas are sampled at the last time, and read via a nonuser interface access, summing up the total number of current meaningful image lines, filing in the bitmap file header, and closing said bitmap file; and sending a control signal to said scanner to stop scanning.

* * * * *